3,706,806
PROPYL OR BUTYL DITHIOL FORMAL

Christian Esclamadon, Billere, Yves Labat, Pau, and Jean-Baptiste Signouret, Billere, France, assignors to Societe Anonyme dite: Societe Nationale des Petroles d'Aquitaine, Courbevoie, France
No Drawing. Filed Jan. 28, 1970, Ser. No. 6,570
Claims priority, application France, Jan. 31, 1969, 6902063
Int. Cl. C07c *149/14*
U.S. Cl. 260—609 R          3 Claims

ABSTRACT OF THE DISCLOSURE

New dithiol compounds include a formal group and have the general formula HS—R—O—CH$_2$—O—R—SH, in which R is a hydrocarbon group of from 1 to 12 carbon atoms, which can be substituted or unsubstituted aliphatic, cycloalkyl or aromatic radicals. These compounds are prepared by causing a chloroalkyl alcohol (Cl—R—OH) to react with formaldehyde so as to effect the acetalization of the alcohol and by treating the dichloro dialkyl formal which is obtained with an acid sulphide of an alkali metal and with hydrogen sulphide. These new dithiol compounds are used for the plasticisation of sulphur and for the production, as new industrial products, of plasticised sulphur compositions.

SUMMARY OF THE INVENTION

The present invention relates to dithiols having a formal group and to the preparation thereof.

It is one of the objects of the invention to provide novel and useful compounds of this kind which possess advantages over other known compounds for various purposes.

A further object is the provision of processes for producing these new compounds and also for using them to produce useful industrial compositions.

The invention provides novel dithiols which have the general formula

HS—R—O—CH$_2$—O—R—SH in which R is a hydrocarbon radical having from 1 to 12 carbon atoms. These hydrocarbon radicals can be aliphatic, cycloalkyl or aromatic; they can be substituted with one or more saturated or unsaturated hydrocarbon groups.

The dithiols defined above are products which are very useful industrially. The simultaneous presence of the thiol functions and of the formal group makes these products very reactive and capable of being used in a large number of fields. Apart from the value of the linear or polycyclic polysulphides which can be obtained by their oxidation, they themselves form a desirable material for the plasticising of sulphur.

The various sulphur compositions which can be obtained by the reaction of molten sulphur with either the dithols having a formal group or with the polysulphides can be used for a large number of purposes. The relative proportions of each constituent can vary within wide limits. Thus the sulphur can have added to it a very wide range of proportions, for example from 1% to 99%, of the plasticiser.

Depending on their composition, the plastic materials produced can be used for many different purposes. They can form excellent coatings, particularly for concrete, brickwork, asphalted surfaces or other similar materials. One particularly practical use is that of the povision of roadway markings or strips. These plastic materials or compositions can also be used to form a floor covering by direct casting, possibly with a mixture of sand and/or gravel, with which they form a cement. These products can also be used as sealing joints, or as a mastic, or as a material in the building industry.

The sulphur compositions which are obtained can be modified in any of the ways known at the present time for similar purposes, such as to impart to the material a better adhesive power and non-inflammability. The plasticised sulphur (mainly when used for the provision of marking strips on roads) can have incorporated in it balls of a plastics material, rubber or glass, and/or suitable dyes.

The dithiols with a formal group provided by the invention can also be used as synthesis intermediaries for the manufacture of products with a biological activity. They are oil modifiers. They can also be used for the many purposes for which mercaptans are normally employed.

The new dithiols with a formal group according to the invention, of the formula HS—R—O—CH$_2$—O—R—SH, are prepared by a process which comprises causing a 1-chloroalkyl alcohol (Cl—R—OH) to react with formaldehyde, so as to obtain the acetalisation of the alcohol, and treating the dichlorodialkyl formal which is obtained with an acid sulphide of an alkali metal and with hydrogen sulphide.

In the case where dimercapto dibutyl formal is prepared, the preferred procedure comprises starting with tetrahydrofuran, treating this latter with gaseous hydrochloric acid, and then adding trioxymethylene to the reaction medium in which the chloro-1,4-butanol is formed, so as to obtain the dichlorobutyl formal. The dichlorinated compound is then treated with an acid sulphide of an alkali metal and liquid H$_2$S.

In the case where dimercaptodipropyl formal is prepared, the procedure involves starting with 1-chloro-3-propanol, which is acetalised with formaldehyde. Then, as in the preceding case, the resulting dichloropropyl formal is treated with an acid sulphide of an alkali metal and liquid hydrogen sulphide.

The invention is illustrated by the non-limiting examples which follow.

Example 1

Into a 4-litre reactor, equipped with a stirrer mechanism, a condenser, a thermometer and a gas inlet, there are introduced 1000 g. of tetrahydrofuran, at 40° C., which is saturated with a stream of gaseous hydrochloric acid for 6 hours, while keeping the temperature at 40° C. The solution adsorbs 540 g. of HCl. This solution is further agitated for a few hours, whereafter 250 g. of trioxymethylene and 500 g. of benzene, for solubilising the medium, are added. The solution is refluxed for 6 hours; the water is separated by azeotropic distillation, the benzene is distilled, neutralised with water containing sodium, and then the organic layer is washed with water until it is neutral. 1390 g. of dichlorodibutyl formal are obtained.

Into an autoclave are introduced 687 g. (3 moles) of dichlorodibutyl formal, 8 moles of potassium acid sulphide in alcoholic solution and 500 ml. of liquid H$_2$S. Stirring takes place for 6 hours, while heating to 120° C. 450 g. of a liquid containing mercaptan are obtained. Analysis thereof shows that a new product is involved, which is dimercaptodibutyl formal. It is characterised by the following constants:

Boiling point=115° C./0.2 mm. Hg
Refractive index=1.495 at 18° C.

The crude mercaptanic liquid or the dimercapto-dibutyl formal reacts with sulphur at 150° C. to give a plasticised modified sulphur having a vitreous transition temperature of −60° C.

Example 2

The acetalisation of 1-chloro-3-propanol is carried out in a reactor by means of formaldehyde. In this way, the dichlorodipropyl formal is obtained.

Into an autoclave are introduced 603 g. (3 moles) of dichlorodipropyl formal, 8 moles of potassium acid sulphide in alcoholic solution and 500 ml. of liquid $H_2S$. Stirring takes place for 6 hours while heating to 120° C. and 390 g. of a mercaptanic liquid are obtained. Analysis shows that this is a new product, which is dimercapto-dipropyl formal, characterised by the following constants:

Boiling point=100° C./0.1 mm. Hg

Analysis thereof gave the following results.—Found (percent): C, 43.02; S, 32.56; H, 8.17; SH, 34.6. Molecular weight, 191. Calculated (percent): C, 42.6; S, 32.6; H, 8.15; SH, 33.6. Molecular weight, 196.

The crude mercaptanic liquid or the pure dithiol react with sulphur at 150° C. to give a plasticised, modified sulphur with a vitreous transition temperature of −48° C.

The sulphur can also be plasticised with the linear or cyclic polysulphides obtained by oxidation of the dithiols.

We claim:

1. A dithiol having a formal group and the general formula

HS—R—O—CH$_2$—O—R—SH in which R is butylene or propylene.

2. A dithiol having a formal group according to claim 1, characterised in that it is dimercaptodibutyl formal.

3. A dithiol having a formal group according to claim 1, characterized in that it is dimercaptodipropyl formal.

References Cited

UNITED STATES PATENTS

| 3,503,930 | 3/1970 | Morris et al. | 260—609 A X |
| 3,318,957 | 5/1967 | Young | 260—609 A |
| 2,919,262 | 12/1959 | Nummy | 260—609 A X |
| 2,490,257 | 12/1949 | Crowley et al. | 260—609 D |

OTHER REFERENCES

Walker: "Formaldehyde," third edition, pp. 364–6 (1962).

LEWIS GOTTS, Primary Examiner

D. R. PHILLIPS, Assistant Examiner

U.S. Cl. X.R.

23—224; 106—19